(12) United States Patent
Owen et al.

(10) Patent No.: US 11,858,575 B2
(45) Date of Patent: Jan. 2, 2024

(54) WALL MOUNT BIKE RACK

(71) Applicant: EAST MOUNTAIN OUTFITTERS LLC, Alpine, UT (US)

(72) Inventors: Charles Blake Owen, Alpine, UT (US); Bryce Allen Owen, Alpine, UT (US)

(73) Assignee: East Mountain Outfitters, LLC, Alpine, UT (US)

( * ) Notice: Subject to any disclaimer, the term of this patent is extended or adjusted under 35 U.S.C. 154(b) by 30 days.

(21) Appl. No.: 17/936,682

(22) Filed: Sep. 29, 2022

(65) Prior Publication Data

US 2023/0115285 A1    Apr. 13, 2023

Related U.S. Application Data

(60) Provisional application No. 63/252,295, filed on Oct. 5, 2021.

(51) Int. Cl.
*B62H 3/12* (2006.01)
*B62H 3/06* (2006.01)

(52) U.S. Cl.
CPC ............... *B62H 3/12* (2013.01); *B62H 3/06* (2013.01)

(58) Field of Classification Search
CPC ... B62H 3/00; B62H 3/02; B62H 3/04; B62H 3/06; B62H 3/08; B62H 3/12
USPC ...................................... 211/17–24
See application file for complete search history.

(56) References Cited

U.S. PATENT DOCUMENTS

| | | | | |
|---|---|---|---|---|
| 626,535 | A * | 6/1899 | Gradlmiller | B60P 3/073 410/3 |
| 650,663 | A * | 5/1900 | Whitcher | B62H 3/04 211/23 |
| 3,921,869 | A * | 11/1975 | Rogers | B60R 9/10 224/532 |
| 4,171,077 | A * | 10/1979 | Richard, Jr. | B60R 9/10 224/535 |
| 4,352,432 | A * | 10/1982 | Smith | B62H 3/08 211/5 |
| 5,190,195 | A | 3/1993 | Fullhart et al. | |

(Continued)

FOREIGN PATENT DOCUMENTS

| DE | 202011108365 U1 * | 2/2012 | ............... B60R 9/06 |
|---|---|---|---|
| FR | 2503654 A1 * | 10/1982 | ............... B62H 3/12 |

(Continued)

OTHER PUBLICATIONS

PCT International Search Report and Written Opinion dated Dec. 5, 2019 for PCT International Patent Application No. PCT/US2019/044865 filed Aug. 2, 2019, 12 pages.

(Continued)

*Primary Examiner* — Patrick D Hawn
(74) *Attorney, Agent, or Firm* — Launchpad IP; Christopher A. Wiklof

(57) ABSTRACT

A bicycle rack includes a bicycle support structure that may be positioned as desired on upper and lower pivot bars. The bicycle support structure includes a wheel hoop that allows the front wheel and handlebars of a suspended bicycle to be leaned. The bicycle support structure may be pivoted relative to the upper and lower pivot bars. The upper and lower pivot bars may include a plurality of mounting points at close spacing.

19 Claims, 10 Drawing Sheets

(56) References Cited

U.S. PATENT DOCUMENTS

| | | | |
|---|---|---|---|
| 5,246,120 A * | 9/1993 | Walker | B62H 3/12 |
| | | | 211/21 |
| D341,348 S | 11/1993 | Williams | |
| 5,526,971 A | 6/1996 | Despain | |
| 5,579,972 A | 12/1996 | Despain | |
| 5,842,581 A * | 12/1998 | Graefe | B62H 3/00 |
| | | | 211/119.004 |
| 5,996,870 A * | 12/1999 | Shaver | B60R 9/06 |
| | | | 224/532 |
| 6,062,451 A | 5/2000 | Lassanske et al. | |
| 6,460,745 B1 | 10/2002 | Weaver | |
| 6,691,878 B1 * | 2/2004 | Ouitz | A47B 97/00 |
| | | | 211/104 |
| 7,604,131 B1 * | 10/2009 | Clark | B62H 3/12 |
| | | | 211/94.01 |
| 8,827,363 B2 * | 9/2014 | Lagier | B61B 12/002 |
| | | | 211/17 |
| 9,321,407 B2 | 4/2016 | Loken | |
| 9,376,063 B2 | 6/2016 | Hein et al. | |
| 10,501,023 B1 * | 12/2019 | Mayers | B60R 9/10 |
| 10,800,342 B2 * | 10/2020 | Salisbury | B62H 3/04 |
| 10,807,664 B2 * | 10/2020 | Greenblatt | B62H 3/12 |
| 11,091,213 B2 * | 8/2021 | Flynn | B62H 3/12 |
| 11,142,133 B1 * | 10/2021 | Oshman | B60R 9/10 |
| 11,554,724 B2 * | 1/2023 | Owen | B60R 9/042 |
| 2001/0035446 A1 | 11/2001 | Walstrom et al. | |
| 2003/0008169 A1 | 5/2003 | Munoz et al. | |
| 2003/0089751 A1 | 5/2003 | Munoz et al. | |
| 2005/0082329 A1 | 4/2005 | Cohen | |
| 2009/0120984 A1 | 5/2009 | Sauter et al. | |
| 2010/0290876 A1 | 11/2010 | Conaster | |
| 2011/0057008 A1 | 3/2011 | Clausen | |
| 2011/0101060 A1 | 5/2011 | Hammond | |
| 2012/0048823 A1 | 3/2012 | Kriner | |
| 2012/0111911 A1 * | 5/2012 | Rempe | B60R 9/10 |
| | | | 224/403 |
| 2012/0168480 A1 | 7/2012 | Gray | |
| 2013/0101383 A1 | 4/2013 | Lynch, Jr. | |
| 2013/0142602 A1 | 6/2013 | Barnts | |
| 2013/0309053 A1 | 11/2013 | Cameron | |
| 2013/0327802 A1 * | 12/2013 | Hammond | B62H 3/02 |
| | | | 211/17 |
| 2014/0027484 A1 | 1/2014 | Loken | |
| 2014/0151421 A1 | 6/2014 | Loken | |
| 2016/0107559 A1 | 4/2016 | Russo | |
| 2016/0129847 A1 | 5/2016 | Mehlen | |
| 2016/0346141 A1 | 12/2016 | Guertler | |
| 2018/0264984 A1 * | 9/2018 | Nakagiri | B60P 7/06 |
| 2018/0354427 A1 * | 12/2018 | Yazdian | B60R 9/10 |
| 2019/0009730 A1 | 1/2019 | Hintz | |
| 2019/0016271 A1 | 1/2019 | Garceau | |
| 2019/0161022 A1 | 5/2019 | McFadden | |
| 2020/0189481 A1 | 6/2020 | Doelitsch | |
| 2020/0346505 A1 | 11/2020 | Loewen | |
| 2020/0406830 A1 | 12/2020 | Owen et al. | |
| 2021/0107580 A1 | 4/2021 | Flynn | |

FOREIGN PATENT DOCUMENTS

| | | |
|---|---|---|
| WO | 03064214 A1 | 8/2003 |
| WO | 2017001224 A1 | 9/2019 |

OTHER PUBLICATIONS

PCT International Preliminary Report on Patentability dated Feb. 9, 2021 for PCT International Patent Application No. PCT/US2019/044865 filed Aug. 2, 2019, 8 pages.

"ALTA Racks" (Aug. 6, 2017, retrieved on Sep. 30, 2019, retrieved from the Internet at https://www.instragram.com/p/BXdA77IhUYi/.

* cited by examiner

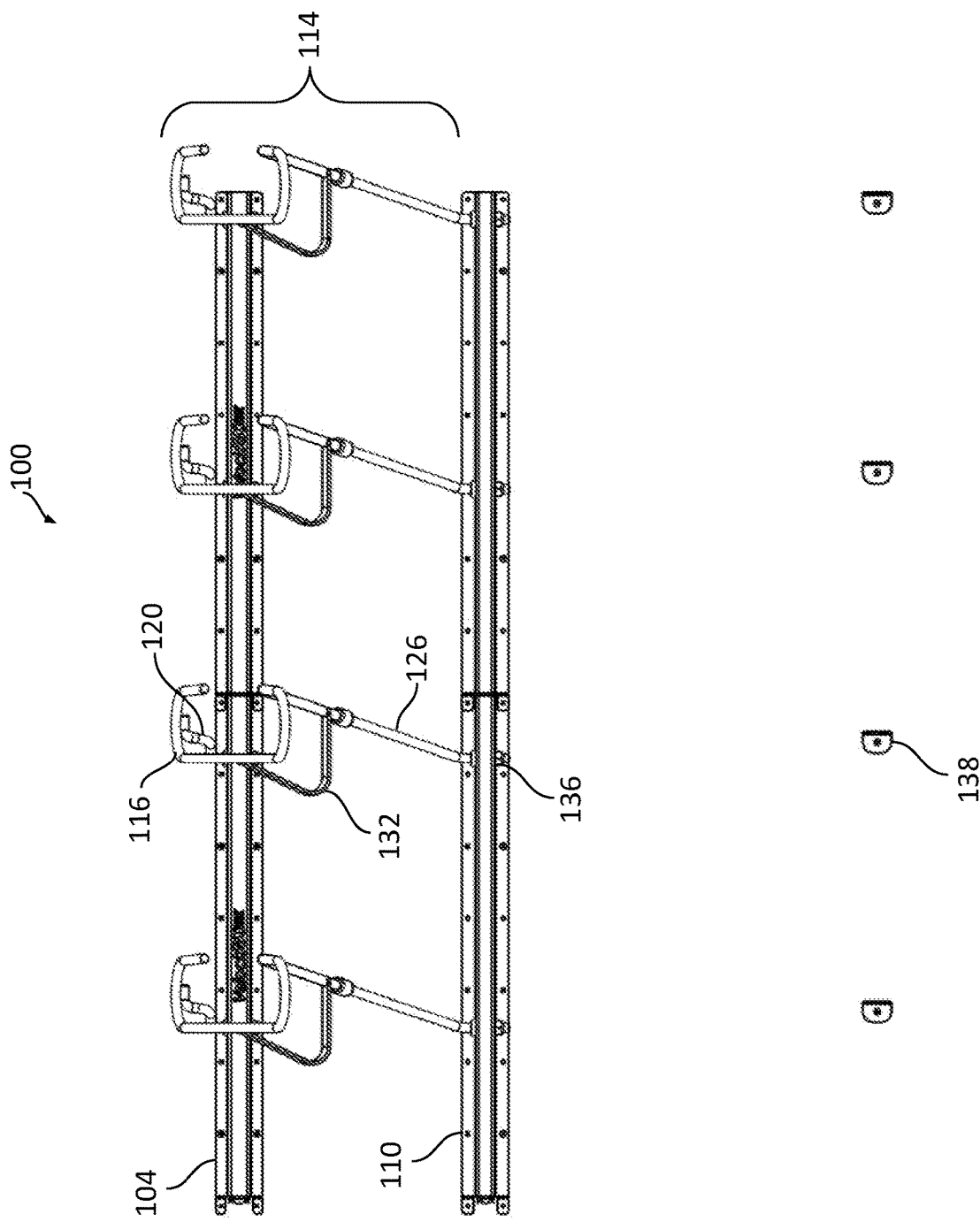

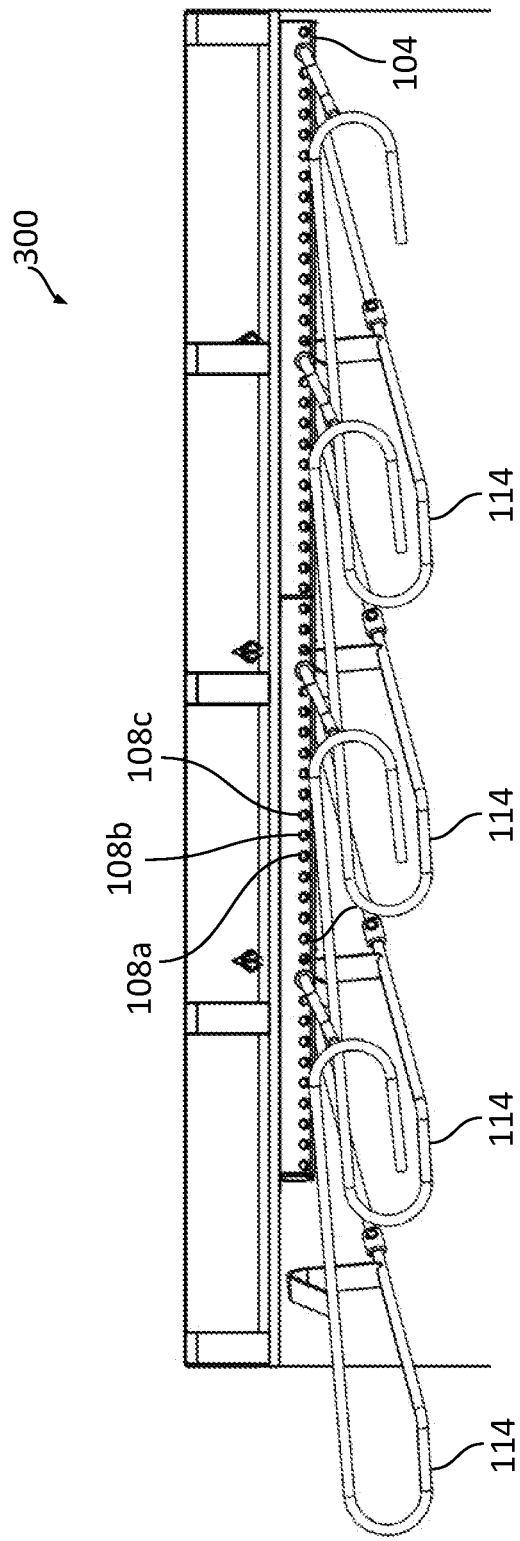

WALL MOUNT BIKE RACK

CROSS REFERENCE TO RELATED APPLICATIONS

The present application claims benefit of U.S. Provisional Patent Application No. 63/252,295, entitled "WALL MOUNT BIKE RACK," filed Oct. 5, 2021, herewith. The present application is related to U.S. patent application Ser. No. 17/339,562, entitled "BICYCLE RACK WITH C-HOOPS," filed Jun. 4, 2021, herewith. To the extent not inconsistent with the disclosure herein, both applications are incorporated by reference in their entireties.

SUMMARY

According to an embodiment, a bicycle rack includes an upper pivot bar configured to be fastened to a vertical structure in a horizontal orientation, the upper pivot bar defining a one or more upper mounting points. A lower pivot bar is configured to be fastened to the vertical structure parallel to and below the upper pivot bar, the lower pivot bar defining one or more lower mounting points, the one or more lower mounting points being configured for vertical alignment with respective upper mounting points. A bicycle support structure is configured to be mounted to the upper pivot bar and the lower pivot bar and to support a bicycle to hang from the bicycle support structure. The bicycle support structure may be configured to pivot with respect to the upper and lower pivot bars such that a supported bicycle may pivot with respect to a plane of the vertical structure.

According to an embodiment, the bicycle support structure includes a wheel hoop for receiving a bicycle front wheel, an upper support arm coupled to the wheel hoop at a first location, the upper support arm terminating in an upper coupler configured to couple to an upper mounting point on the upper pivot bar, a lower support arm coupled to the wheel hoop at a second location different from the first location, the lower support arm terminating in a lower coupler configured to couple to a lower mounting point on the lower pivot bar, and an L-bracket coupled to the lower support arm and to the wheel hoop at a third location different from the first and second locations.

BRIEF DESCRIPTION OF THE DRAWINGS

FIG. 1A is a front elevation view of a bicycle rack, according to an embodiment.

FIG. 3A is a top (plan) view of a bicycle rack in a position with bicycle support structures pivoted away from perpendicular to upper and lower pivot bars, according to an embodiment.

DETAILED DESCRIPTION

Figure 1B:
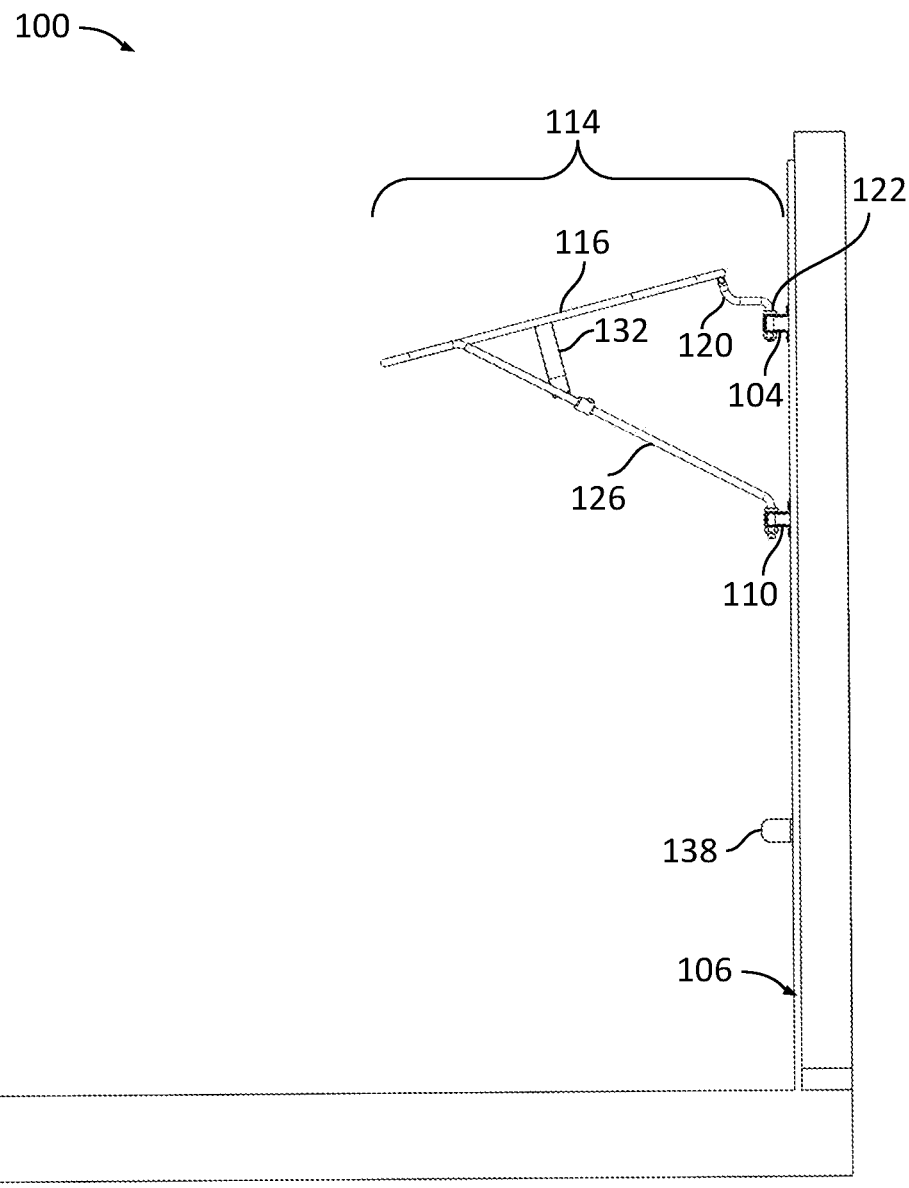
FIG. 1B is a side elevation view of the bicycle rack of FIG. 1A, according to an embodiment.

In the following detailed description, reference is made to the accompanying drawings, which form a part hereof. In the drawings, similar symbols typically identify similar components, unless context dictates otherwise. Other embodiments may be used and/or other changes may be made without departing from the spirit or scope of the disclosure.

Figure 1C:
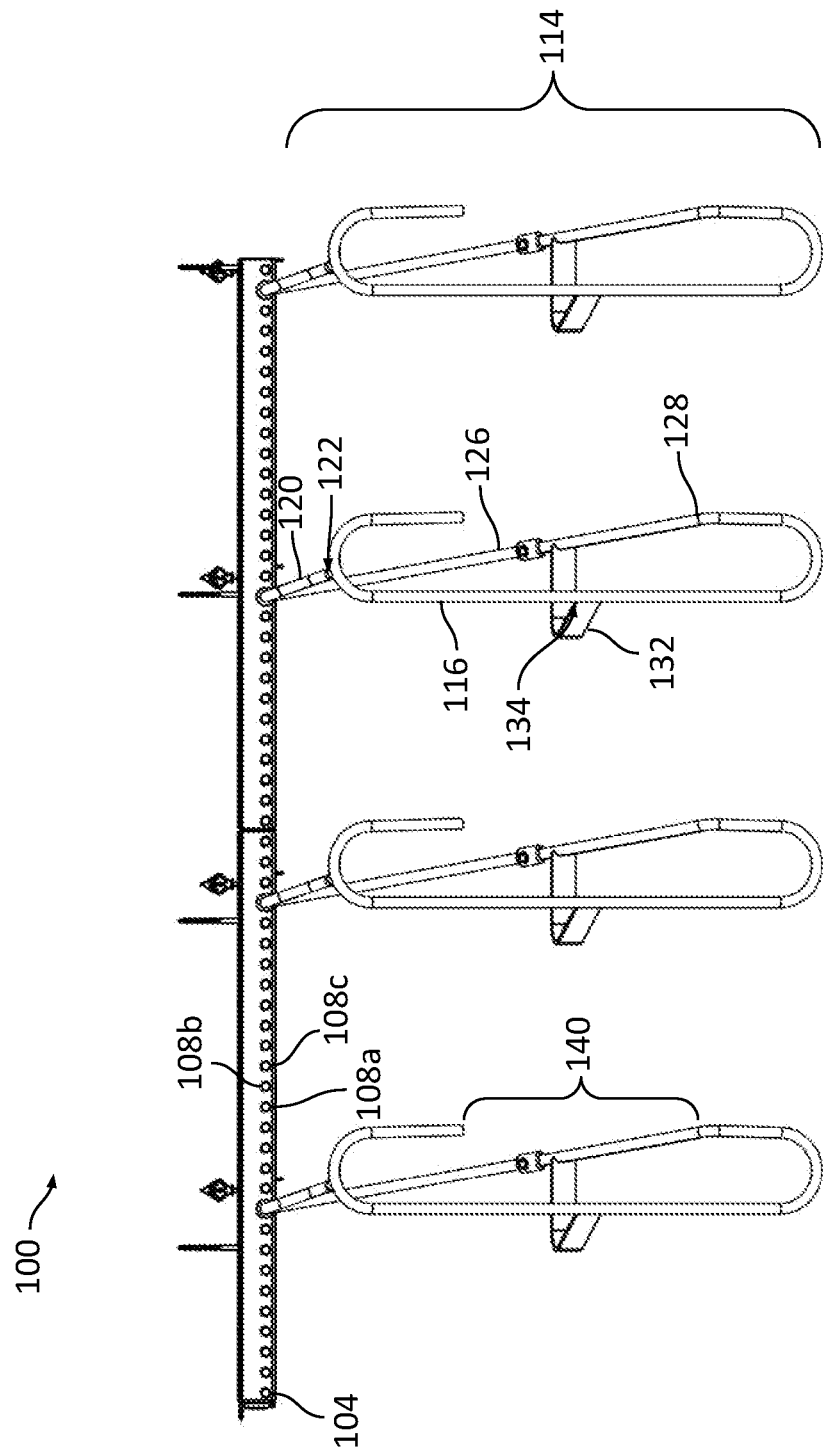
FIG. 1C is a top (plan) view of the bicycle rack of FIGS. 1A-1B, according to an embodiment.

FIG. 1A is a front elevation view of a bicycle rack 100, according to an embodiment. FIG. 1B is a side elevation view of the bicycle rack 100 of FIG. 1A, according to an embodiment. FIG. 1C is a top (plan) view of the bicycle rack 100 of FIGS. 1A-1B, according to an embodiment.

According to embodiments, and referring to FIGS. 1A-1C, the bicycle rack 100 includes an upper pivot bar 104 configured to be fastened to a vertical structure 106 (such as a wall) in a horizontal orientation, the upper pivot bar 104 defining one or more upper mounting points 108a, 108b, 108c, etc. A lower pivot bar 110 may be configured to be fastened to the vertical structure 106 parallel to and below the upper pivot bar 104, the lower pivot bar 110 defining one or more lower mounting points 112a, 112b, 112c, etc. The upper and lower mounting points and relationships therebetween may be visualized with reference to FIG. 4. FIG. 4 is an oblique view 400 of the bicycle rack shown in earlier FIGS. 1A-1C, 2A-2C, and 3A-3B, according to an embodiment. The one or more lower mounting points 112a, 112b, 112c may be configured for vertical alignment with respective ones of the one or more upper mounting points 108a, 108b, 108c.

Figure 2A:
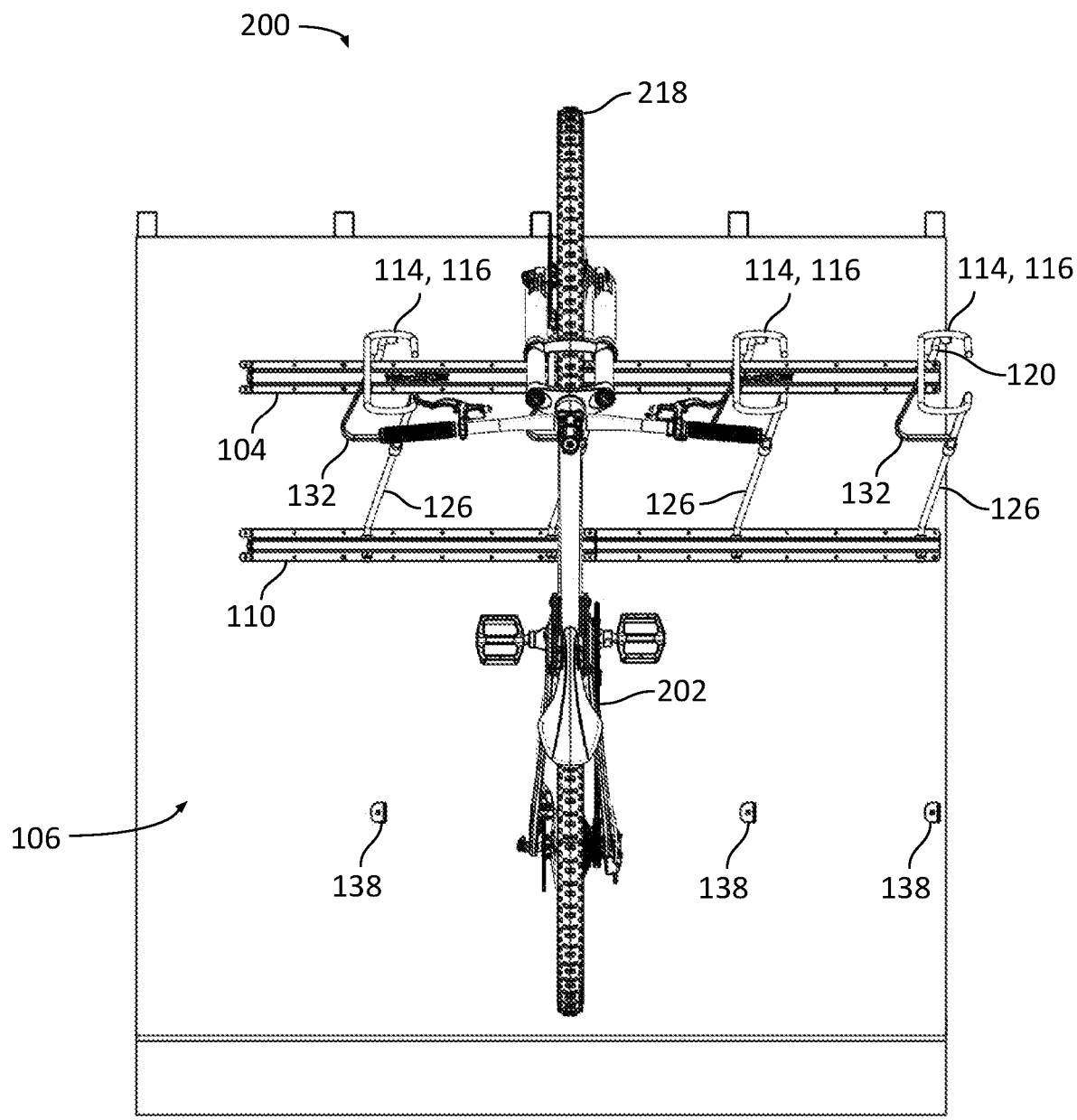
FIG. 2A is a front elevation view of a bicycle rack holding a bicycle, according to an embodiment.
Figure 2B:
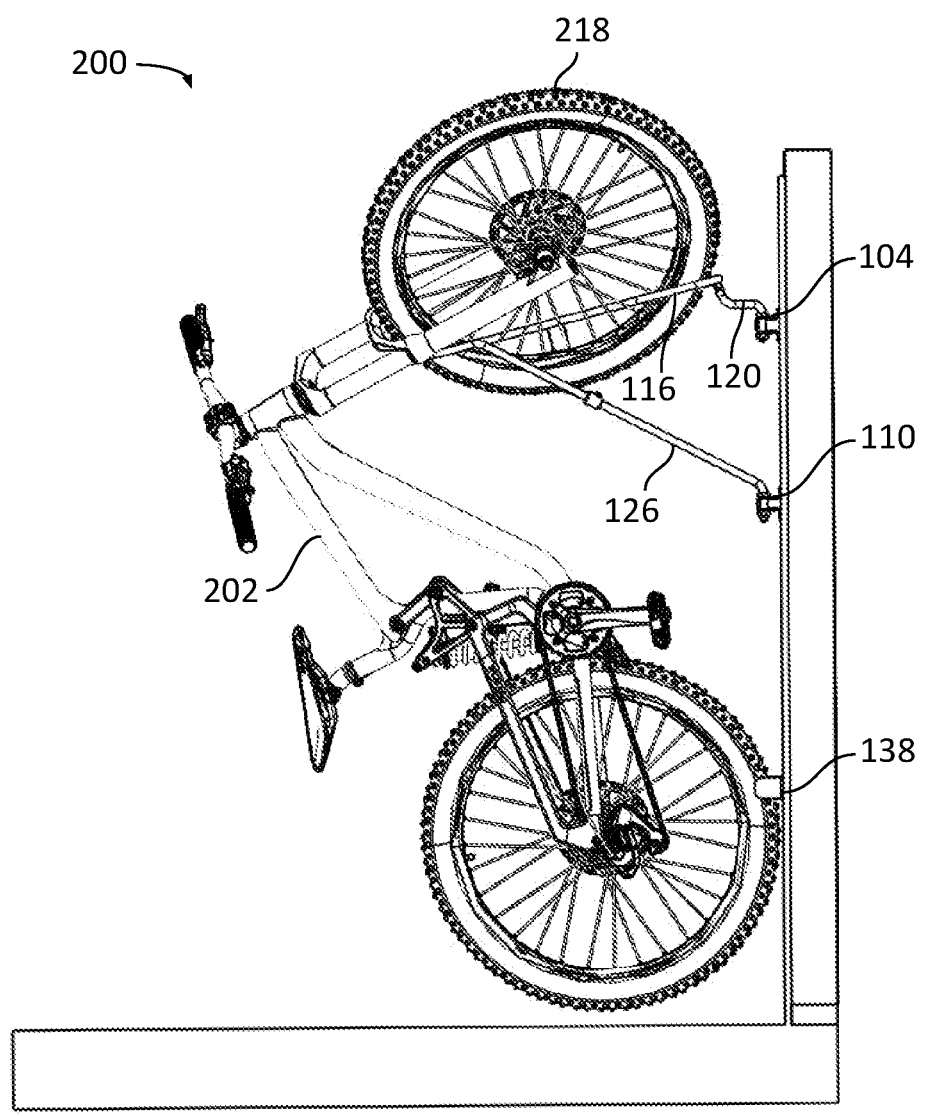
FIG. 2B is a side elevation view of the bicycle rack holding the bicycle of FIG. 2A, according to an embodiment.
Figure 2C:
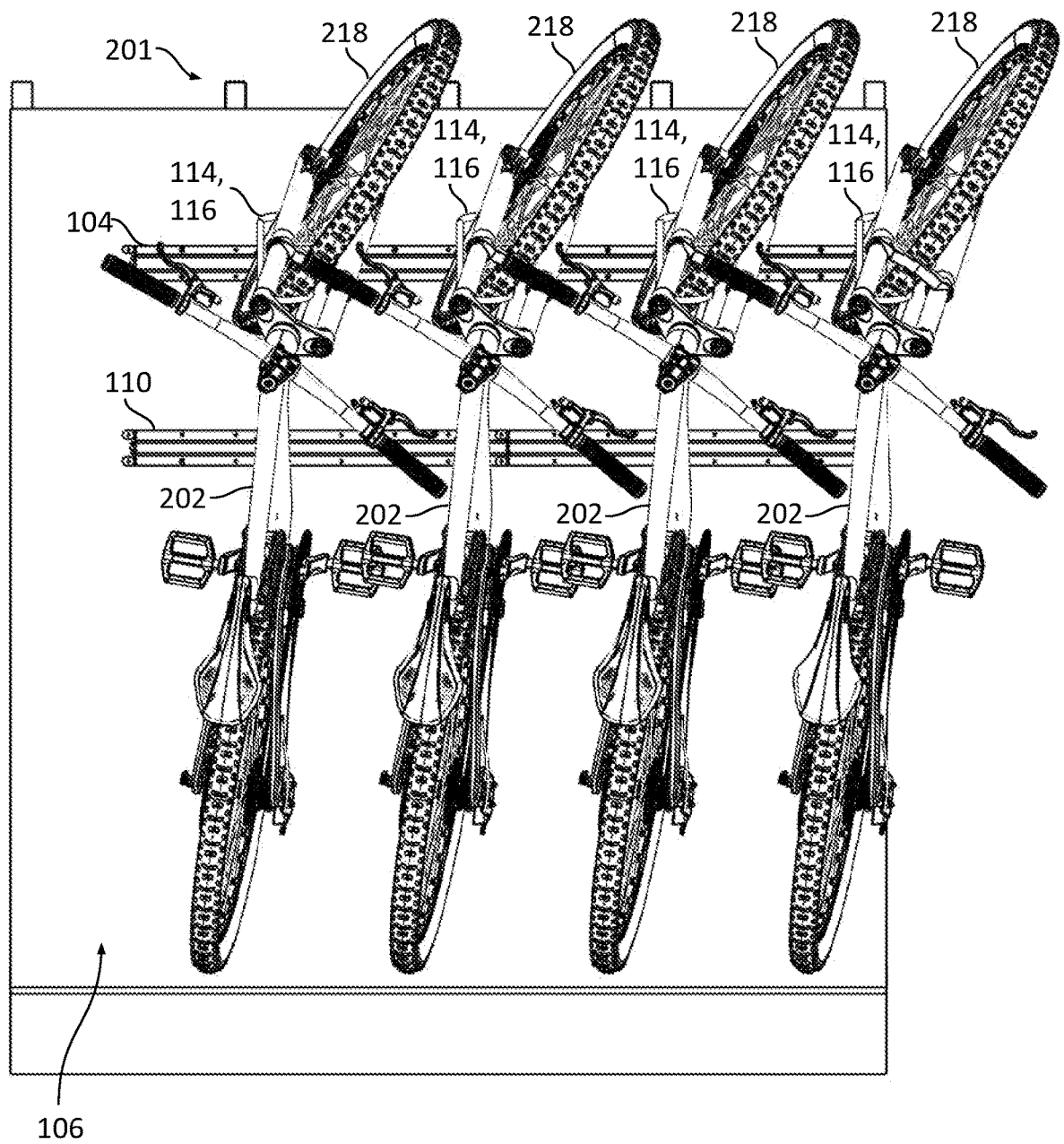
FIG. 2C is a front elevation view of the bicycle rack of FIGS. 1A-1C and 2A-2B holding a plurality of bicycles, according to an embodiment.

FIG. 2A is a front elevation view 200 of a bicycle rack holding a bicycle 202, according to an embodiment. The bicycle 200 may be loaded into the bicycle support structure 114 with the front wheel 218 of the bicycle vertical. This allows the user to easily mount the bicycle 202 because the bicycle may be lifted by the handlebars and placed directly in the wheel hoop 116 of the bicycle support structure 114. FIG. 2B is a side elevation view 200 of the bicycle rack holding the bicycle 202 of FIG. 2A, according to an embodiment. FIG. 2C is a front elevation view 201 of the bicycle rack of FIGS. 1A-1C and 2A-2B holding a plurality of bicycles 202, according to an embodiment. By inspection of FIGS. 2A-2C, one may see that while FIG. 2A shows a bicycle 202 with its front wheel 218 straight, FIGS. 2B and 2C show the bicycle(s) 202 hanging from the bicycle support structure 114 with the front wheels 218 leaned to the right, as seen from the perspective of FIG. 2B. The bicycle 202 may be easily lifted into the bicycle support structure 114 with its front wheel 218 aligned vertically followed by turning the handlebar to lean the front wheel 218 to the right after the weight of the bicycle 202 is supported by the bicycle support structure 114, as shown in FIGS. 2B and 2C. As may be appreciated by inspection of FIG. 2C, leaning the front wheels 218 of neighboring bicycles 202 one side allows neighboring bicycles 202 to be spaced more closely on the bicycle rack than if the front wheels 218 and handlebars remained in a "straight ahead" orientation. This may be used to increase the capacity of the bicycle rack.

In other words, in an embodiment, a user may load a bicycle 202 into the bicycle support structure 114, and specifically the wheel hoop 116, with the front wheel 218 of the bicycle 202 in a vertical position, as shown in FIG. 2A. The user may subsequently allow the front wheel 218 of the bicycle 202 to rotate to a bicycle storage position as illustrated in FIG. 2C. As described and shown elsewhere herein, the wheel hoop 116 may include first and second hoop segments 139, 141 that define between them an open segment 140 sized to allow the bicycle front wheel 218 to lean in a way that causes the handlebars of the bicycle 202 to rotate away from the handlebars of a neighboring bicycle 202.

In another embodiment, the wheel hoop 116 is formed as a closed shape or substantially closed shape including an outward bulge shaped to allow a bicycle front wheel and handlebars to rotate away from vertical without interfering with bicycle spokes, axle, or front fork (not shown).

In an embodiment, the bicycle support structure 114 is configured to be coupled to a vehicle-mounted sports rack for carrying bicycles with the vehicle.

Figure 5:
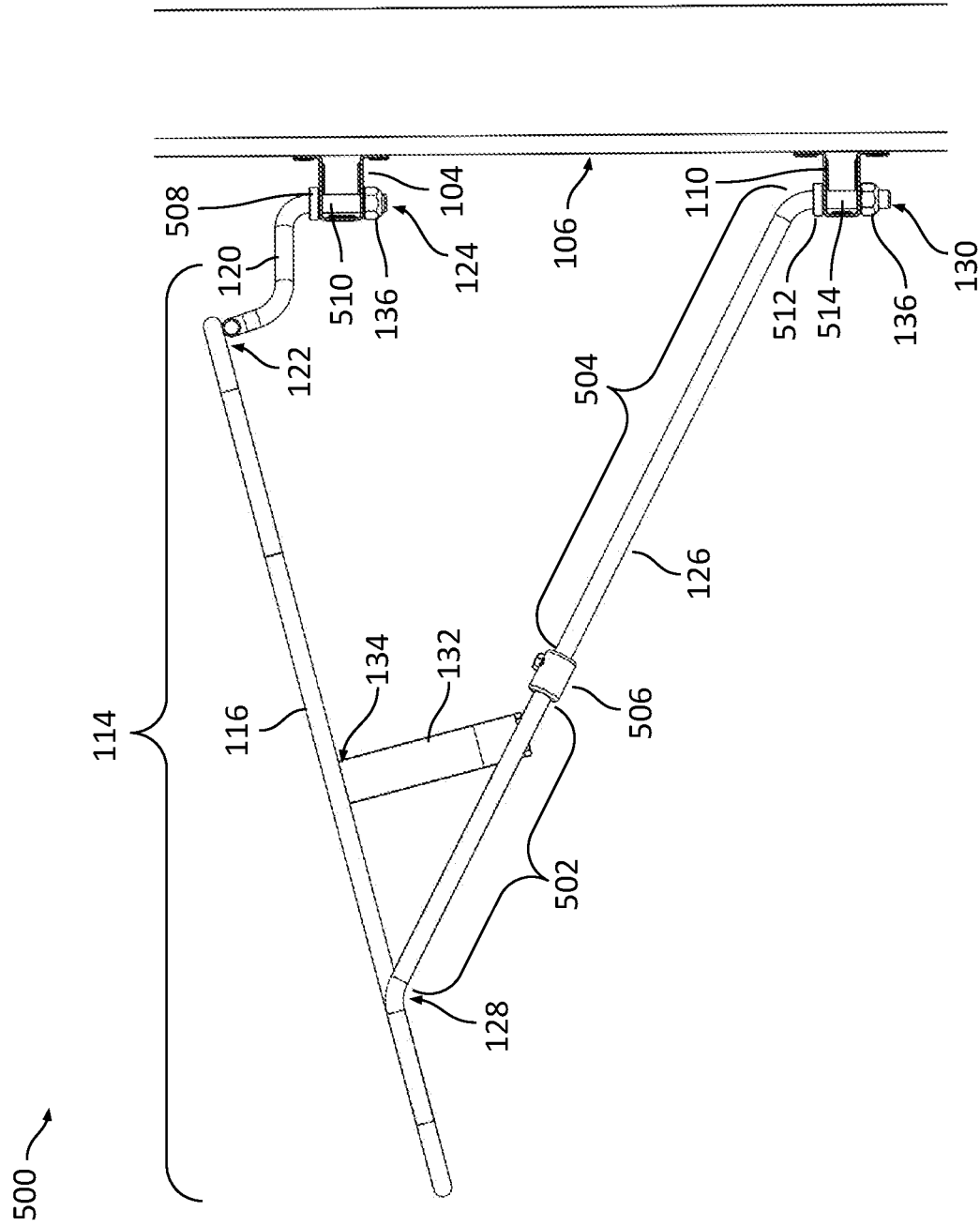
FIG. 5 is a side elevation view of a bicycle support structure coupled to upper and lower pivot bars, according to an embodiment.

FIG. 5 is a side elevation view 500 of a bicycle support structure coupled to upper and lower pivot bars, according to an embodiment.

The bicycle rack includes a bicycle support structure 114 configured to be mounted to the upper pivot bar 104 and the lower pivot bar 110 and to support a bicycle 202 to hang from the bicycle support structure (e.g., see FIGS. 2A-2C). The bicycle support structure 114 may include a wheel hoop 116 for receiving a bicycle front wheel 218. An upper support arm 120 may be coupled to the wheel hoop 116 at a first location 122, the upper support arm 120 terminating in an upper coupler 124 configured to couple to an upper mounting point 108 on the upper pivot bar 104. A lower support arm 126 may be coupled to the wheel hoop 116 at a second location 128 different from the first location 122, the lower support arm 126 terminating in a lower coupler 130 configured to couple to a lower mounting point 112 on the lower pivot bar 110. An L-bracket 132 may be coupled to the lower support arm 126 and to the wheel hoop 116 at a third location 134 different from the first and second locations 122, 128. The upper support arm 120, L-bracket 132, and lower support arm 126 and their respective points of attachment 122, 134, 128 may define a plane in which the wheel hoop 116 is supported relative to the upper and lower pivot bars 104, 110 and provide for stable support of a bicycle 202 hung from the wheel hoop 116.

In an embodiment, the upper support arm 120 includes the upper coupler 124 coupled directly to the wheel hoop 116 at the first location 122. In other words, the upper support arm 120 may be vestigial. The upper support arm 120 may consist essentially of the upper coupler 124 directly welded or otherwise coupled to the first location 122 on the wheel hoop 116. In an embodiment, the upper support arm 120 may be continuous with the wheel hoop 116 such that the upper coupler 124 (and the upper support arm 120, if more than vestigial) may be an end of a rod formed as at least a portion of the wheel hoop 116.

According to an embodiment, the lower support arm includes a first portion 502 continuous with the wheel hoop 116 and bent at an angle relative to a plane of a wheel-receiving portion of the wheel hoop 116. According to an embodiment, the lower support arm 126 includes a first portion 502 coupled to the wheel hoop 116 and a second portion 504 coupled to a lower end of the first portion 502, such that the lower coupler 130 is formed on or coupled to a lower end of the second portion 506 of the lower support arm 126. The lower support arm may include an intermediate coupler 506, such as a sleeve with set screws, configured to couple the first portion 502 of the lower support arm 126 to the second portion 504 of the lower support arm 126.

A lower end of the L-bracket 132 may be coupled to the intermediate coupler 506 (arrangement not shown). In another embodiment, the lower end of the L-bracket 132 is welded or otherwise coupled to the first portion 502 of the lower support arm 126.

In an embodiment, the wheel hoop 116 includes first and second hoop segments 139, 141 that define an open segment 140 (see FIG. 1C) selected to allow a bicycle front wheel and handlebars to lean or rotate away from vertical without interfering with bicycle spokes, axle, or front fork. It will be recognized that a bicycle wheel placed within the wheel hoop 116 and resting against the L-bracket 132 may be tilted or rotated to the right, as viewed in FIG. 1C (see also FIG. 2C). In this position, the first and second hoop segments 139, 141 contact and support the rim of the wheel, while no part of the wheel hoop 116 makes contact with the wheel spokes or axle, etc.

In another embodiment, the wheel hoop 116 forms a closed or substantially closed shape including an outward bulge shaped to allow a bicycle front wheel and handlebars to lean or rotate away from vertical without interfering with bicycle spokes, axle, or front fork (arrangement not shown).

In an embodiment, a user may load a bicycle 202 into the bicycle support structure 114, and specifically the wheel hoop 116, with the front wheel 218 of the bicycle 202 in a vertical position, as shown in FIG. 2A. The user may subsequently allow the front wheel 218 of the bicycle 202 to rotate to a bicycle storage position as illustrated in FIG. 2C.

In an embodiment, the bicycle support structure 114 is configured to be at least occasionally coupled to a vehicle-mounted sports rack for carrying bicycles with the vehicle.

The bicycle rack may include one or more rear tire stops 138 configured for fastening to the vertical structure 106, each rear tire stop 138 being positioned to maintain a stable vertical orientation of a supported bicycle 202.

Figure 3B:
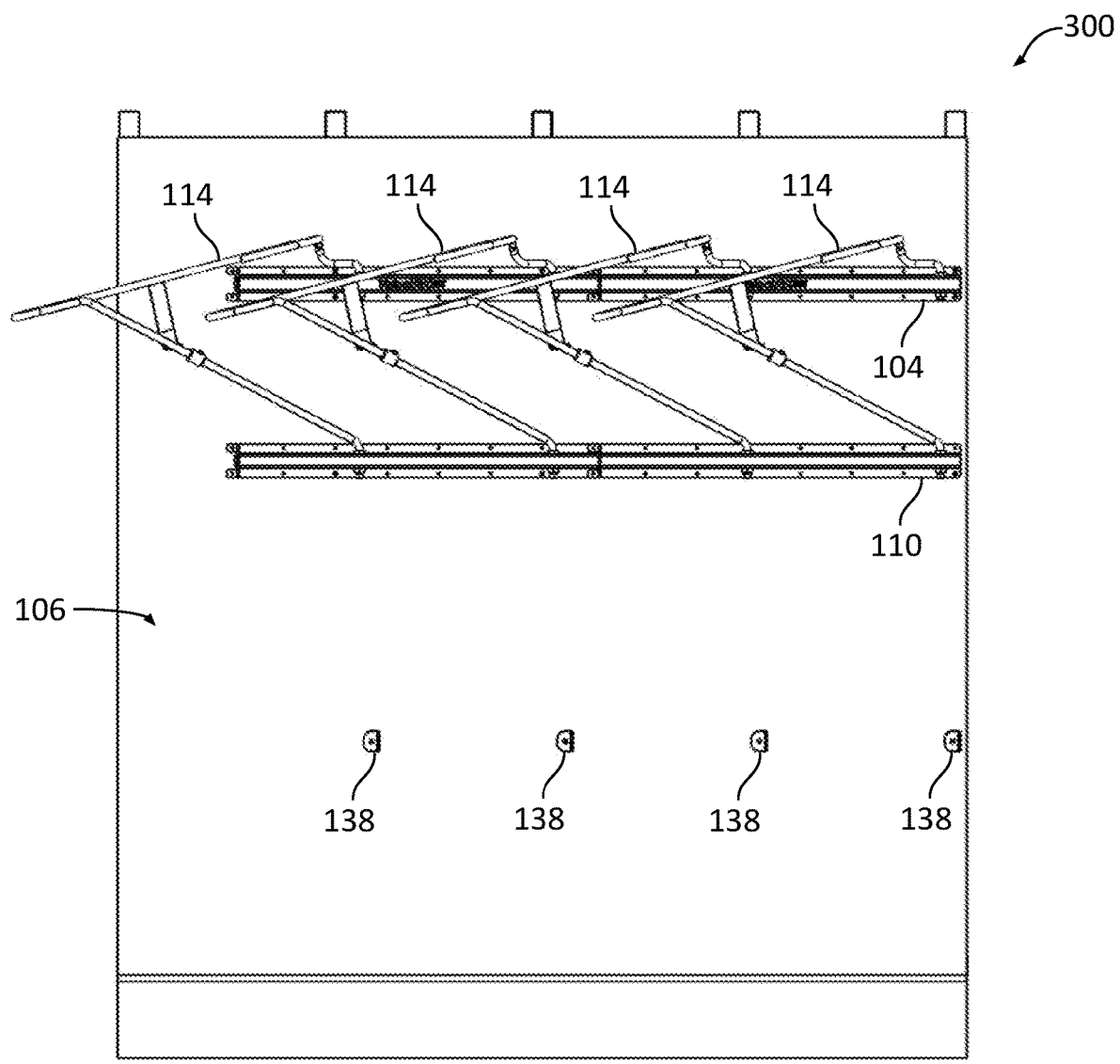
FIG. 3B is a front elevation view of the bicycle rack in the position of FIG. 3A, according to an embodiment.
Figure 4:
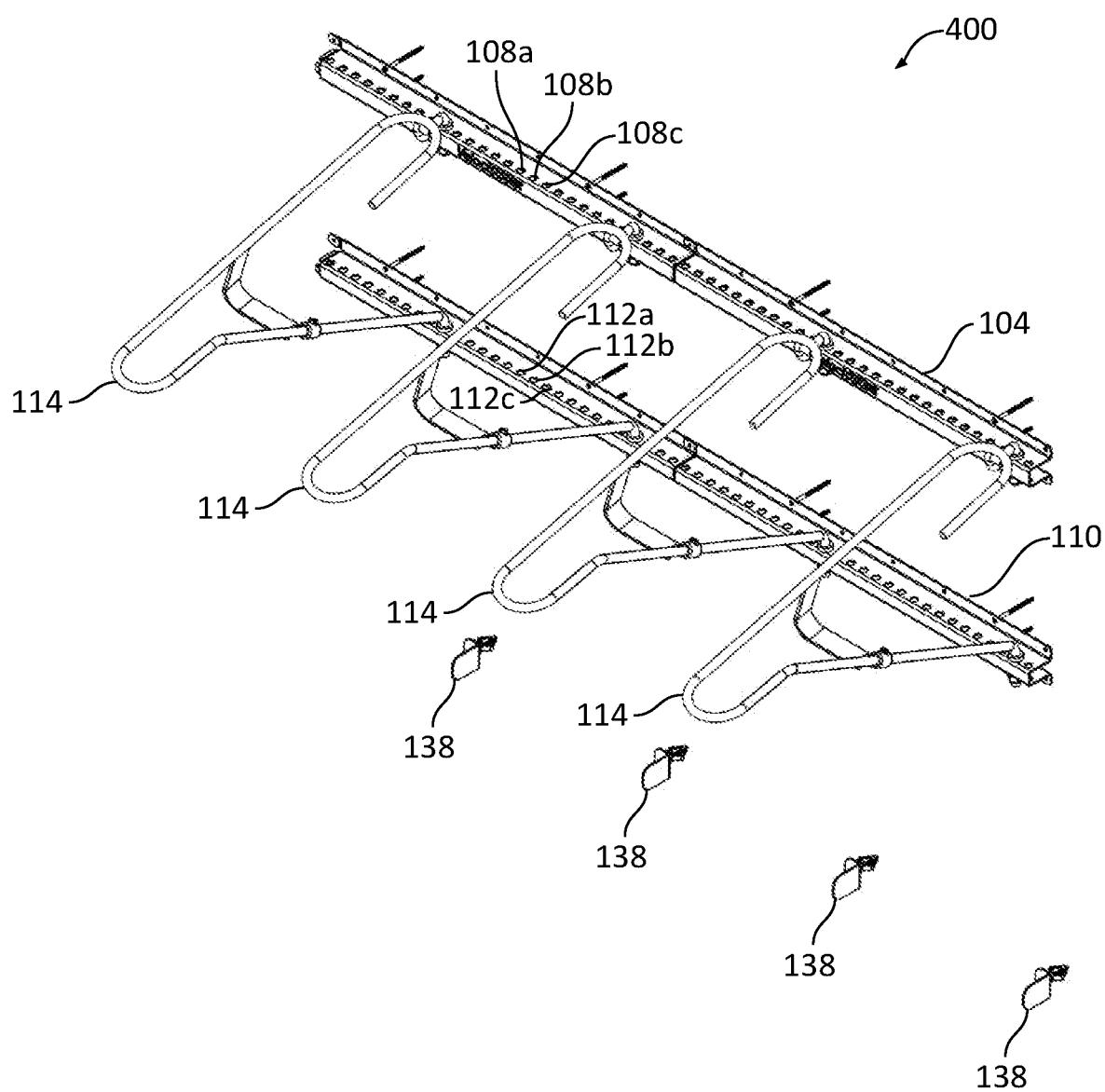
FIG. 4 is an oblique view of the bicycle rack shown in earlier FIGS. 1A-1C, 2A-2C, and 3A-3B, according to an embodiment.

FIG. 3A is a top (plan) view of a bicycle rack in a position 300 with bicycle support structures pivoted away from perpendicular to upper and lower pivot bars, according to an embodiment. FIG. 3B is a front elevation view of the bicycle rack in the position 300 of FIG. 3A, according to an embodiment. FIG. 4 is an oblique view of the bicycle rack shown in FIGS. 1A-1C, 2A-2C, and 3A-3B, according to an embodiment.

The upper and lower couplers 124, 130 cooperate with respective upper and lower mounting points 108, 112 to enable pivoting of the bicycle support structure 114 relative to the upper and lower pivot bars 104, 110. The enabled pivoting of the bicycle support structure 114 relative to the upper and lower pivot bars 104, 110 allows pivoting of a bicycle to provide access to a side of the bicycle even when other closely spaced bicycles are supported by the bicycle rack 100.

The pivoting motion of the bicycle support structure may allow bicycle support structure 114 to be stored closer to the vertical structure 114 than when the bicycle support structure 114 is disposed perpendicular to the upper and lower pivot bars 104, 110.

The upper mounting points 108a, 108b, 108c may include apertures defined by the upper pivot bar 104. The upper coupler 124 may include an upper flange 508, and an upper rod 510 configured to slide through a selected one of the upper mounting points 108a, 108b, 108c such that the upper flange rests against the upper pivot bar 104. In an embodiment the upper rod 510 is threaded. The bicycle rack may further include a friction nut 136 configured to be turned onto the threaded upper rod 510 and to exert a compression force on the upper pivot bar 104, between the friction nut and the upper flange 508. The friction nut 136-exerted compression force may apply a damping of pivoting of the bicycle support structure 114 relative to the upper pivot bar 104. A degree to which the pivoting is damped may be controlled by adjustment of a position of the friction nut 136 on the upper rod 510; i.e., damping may be increased or decreased by tightening or loosening the friction nut.

Similarly, the lower mounting points 112a, 112b, 112c may include apertures defined by the lower pivot bar 110. The lower coupler 130 may include a lower flange 512, and a lower rod 514 configured to slide through a selected one of the lower mounting points 112a, 112b, 112c. In an embodiment, the lower rod 514 is threaded, and the bicycle rack may further include a friction nut 136 configured to be turned onto the threaded lower rod 514 and to exert a compression force on the lower pivot bar 110, between the friction nut and the lower flange 512. The friction nut 136-exerted compression force may similarly control a damping of pivoting of the bicycle support structure 114 relative to the lower pivot bar 110.

According to embodiments, the upper and lower couplers 124, 130 include respective upper and lower flanges 508, 512, threaded upper and lower rods 510, 514, and friction nuts 136, provided for tightening against the upper pivot bar 104 and the lower pivot bar 110, respectively.

According to an embodiment, the upper and lower flanges 508, 512 may be, for example, welded to the upper and lower couplers 124, 130, respectively. According to another embodiment, the upper and lower rods 510, 514 have reduced diameters, relative to diameters of the upper and lower support arms 120, 126, and the upper and lower flanges 508, 512 include washers positioned over the upper and lower rods against shoulders formed where the upper and lower support arms transition to the smaller diameters of the upper and lower rods.

According to an embodiment, the wheel hoop 116 defines an open segment 140 (see FIG. 1C) selected to allow a bicycle front wheel and handlebars to lean or rotate away from vertical without interfering with bicycle spokes, axle, or front fork. FIGS. 2B and 2C illustrate the bicycle front wheel 218 and handlebars in the leaned or rotated position. The open segment 140 of the wheel hoop 116 and corresponding enabled rotation of bicycle front wheel and handlebars may allow bicycles to be suspended more closely together than if the bicycle front wheels were required to be maintained in a vertical orientation, especially as seen in FIG. 2C. As indicated above, a bulge (not shown) in a wheel hoop 116 may provide a function similar to the open segment 140.

The bicycle rack may further include one or more rear tire stops 138 configured for fastening to the vertical structure, each rear tire stop being positioned to maintain a stable vertical orientation of a supported bicycle 202.

According to an embodiment, the plurality of upper mounting points 108a, 108b, 108c and lower mounting points 112a, 112b, 112c are spaced more closely than a horizontal extent of the wheel hoop 116, such that not all mounting points 108a, 108b, 108c, 112a, 112b, 112c may be simultaneously populated with respective upper and lower couplers 124, 130 of different bicycle support structures 114. This over-provisioning of upper and lower mounting points 108a, 108b, 108c, 112a, 112b, 112c may be useful for adapting the bicycle rack to bicycles having differing dimensions and also for maximizing storage capacity of a given bicycle rack. For example, the plurality of upper and lower mounting points 108a, 108b, 108c, 112a, 112b, 112c may be spaced relatively close together to allow the selection of a spacing between pairs of bicycle support structures 114, depending upon which of the upper and lower mounting points are occupied by bicycle support structures, and the number of unoccupied mounting points between each pair of adjacent support structures. Thus, a user may accommodate a plurality of different suspended bicycle horizontal extents at closest spacing by positioning the bicycle support structures with different numbers of unoccupied upper and lower mounting points 108a, 108b, 108c, 112a, 112b, 112c between mounting points occupied by adjacent bicycle support structures. This enables the simultaneous storage of, e.g., children's bicycles and adults' bicycles with sufficient space between each for access, but with a minimum of wasted or unnecessary space. In other words, a plurality of bicycle support structures 114 may be coupled to particular ones of the plurality of upper and lower apertures 108a, 108b, 108c, 112a, 112b, 112c to provide a selected spacing between each pair of neighboring bicycles 202.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A bicycle rack, comprising:
an upper pivot bar configured to be fastened to a vertical structure in a horizontal orientation, the upper pivot bar defining one or more upper mounting points;
a lower pivot bar configured to be fastened to the vertical structure parallel to and below the upper pivot bar, the lower pivot bar defining one or more lower mounting points, the one or more lower mounting points being configured for vertical alignment with respective ones of the one or more upper mounting points; and
a bicycle support structure configured to be mounted to the upper pivot bar and the lower pivot bar and to support a bicycle to hang from the bicycle support structure, the bicycle support structure including:
a wheel hoop for receiving a bicycle front wheel;
an upper support arm coupled to the wheel hoop at a first location, the upper support arm terminating in an upper coupler configured to couple to an upper mounting point on the upper pivot bar;
a lower support arm coupled to the wheel hoop at a second location different from the first location, the lower support arm terminating in a lower coupler configured to couple to a lower mounting point on the lower pivot bar; and
an L-bracket coupled to the lower support arm and to the wheel hoop at a third location different from the first and second locations;
wherein the bicycle support structure is configured to pivot with respect to the upper and lower pivot bars;
whereby a supported bicycle is pivots with respect to a plane of the vertical structure.

2. The bicycle rack of claim 1, wherein the upper and lower couplers cooperate with respective upper and lower mounting points to enable pivoting of the bicycle support structure relative to the upper and lower pivot bars.

3. The bicycle rack of claim 1, wherein the one or more upper mounting points include one or more apertures defined by the upper pivot bar; and wherein the upper coupler includes an upper rod configured to slide through a selected one of the one or more apertures.

4. The bicycle rack of claim 3, wherein the upper support arm includes the upper rod coupled to the wheel hoop at the first location.

5. The bicycle rack of claim 3, wherein the upper coupler comprises an upper threaded rod; and further comprising:
a friction nut configured to be turned onto the upper threaded rod and to exert pressure against the upper pivot bar;
whereby the friction nut exerted pressure controls a damping of pivoting motion of the bicycle support structure relative to the upper pivot bar.

6. The bicycle rack of claim 1, wherein the one or more lower mounting points comprise one or more apertures defined by the lower pivot bar; and
wherein the lower coupler comprises a lower rod configured to slide through a particular one of the one or more lower apertures vertically aligned with a particular one of the one or more upper mounting points.

7. The bicycle rack of claim 6, wherein the lower coupler comprises a lower threaded rod; and further comprising:
a friction nut configured to be turned onto the lower threaded rod and to exert pressure against the lower pivot bar;
whereby the friction nut-exerted pressure controls a damping of pivoting motion of the bicycle support structure relative to the lower pivot bar.

8. The bicycle rack of claim 1, wherein the lower support arm includes a first portion continuous with the wheel hoop and bent at an angle relative to a plane of a wheel-receiving portion of the wheel hoop.

9. The bicycle rack of claim 1, wherein the lower support arm includes a first portion coupled to the wheel hoop and a second portion coupled to a lower end of the first portion; and
wherein the lower coupler is formed on or coupled to a lower end of the second portion of the lower support arm.

10. The bicycle rack of claim 9, wherein the lower support arm includes an intermediate coupler configured to couple the first portion of the lower support arm to the second portion of the lower support arm.

11. The bicycle rack of claim 10, wherein a lower end of the L-bracket is coupled to the intermediate coupler.

12. The bicycle rack of claim 9, wherein a lower end of the L-bracket is coupled to the first portion of the lower support arm.

13. The bicycle rack of claim 1, wherein the wheel hoop defines an open segment sized to allow a bicycle front wheel and handlebars to lean away from vertical without interfering with bicycle spokes, axle, or front fork.

14. The bicycle rack of claim 1, wherein the wheel hoop comprises a closed shape including an outward bulge shaped to allow a bicycle front wheel and handlebars to lean away from vertical without interfering with bicycle spokes, axle, or front fork.

15. The bicycle rack of claim 1, wherein the bicycle support structure is configured to be coupled to a vehicle-mounted sports rack for carrying bicycles with the vehicle.

16. The bicycle rack of claim 1, further comprising one or more rear tire stops configured for fastening to the vertical structure, each rear tire stop being positioned to maintain a stable vertical orientation of a supported bicycle.

17. The bicycle rack of claim 1, wherein the one or more upper mounting points includes a plurality of upper mounting points;
wherein the one or more lower mounting points includes a plurality of lower mounting points; and
wherein the plurality of upper mounting points and the plurality of lower mounting points are each spaced more closely than a horizontal extent of the bicycle support structure such that not all mounting points may be simultaneously populated with respective upper and lower couplers of different bicycle support structures.

18. The bicycle rack of claim 1, wherein the one or more upper mounting points includes a plurality of upper mounting points;
wherein the one or more lower mounting points includes a plurality of lower mounting points; and
wherein the plurality of upper mounting points and plurality of lower mounting points are spaced to allow a spacing of bicycle support structures to accommodate a plurality of different suspended bicycle horizontal extents at closest spacing.

19. The bicycle rack of claim 1, wherein the one or more upper mounting points includes a plurality of upper mounting points;
wherein the one or more lower mounting points includes a plurality of lower mounting points; and
wherein the plurality of upper and lower mounting points are spaced to provided selected spacing between neighboring bicycles.

* * * * *